(12) United States Patent
Carlvik et al.

(10) Patent No.: US 10,663,738 B2
(45) Date of Patent: May 26, 2020

(54) SYSTEM AND METHOD FOR HMD CONFIGURABLE FOR VARIOUS MOBILE DEVICE SIZES

(71) Applicant: Samsung Electronics Co., Ltd., Suwon-si, Gyeonggi-do (KR)

(72) Inventors: Ola Carlvik, San Francisco, CA (US); Christopher Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/125,534

(22) Filed: Sep. 7, 2018

(65) Prior Publication Data

US 2019/0171023 A1     Jun. 6, 2019

Related U.S. Application Data

(60) Provisional application No. 62/594,483, filed on Dec. 4, 2017.

(51) Int. Cl.
| | |
|---|---|
| *G02B 27/01* | (2006.01) |
| *G06F 1/16* | (2006.01) |
| *H04M 1/05* | (2006.01) |
| *H04N 5/225* | (2006.01) |
| *H04M 1/02* | (2006.01) |

(52) U.S. Cl.
CPC ..... *G02B 27/0176* (2013.01); *G02B 27/0172* (2013.01); *G06F 1/163* (2013.01); *H04M 1/05* (2013.01); *G02B 2027/0138* (2013.01); *G02B 2027/0169* (2013.01); *H04M 1/0264* (2013.01); *H04N 5/2253* (2013.01)

(58) Field of Classification Search
CPC combination set(s) only.
See application file for complete search history.

(56) References Cited

U.S. PATENT DOCUMENTS

| 8,038,292 B2 | 10/2011 | Matsumoto et al. |
|---|---|---|
| 8,957,835 B2 | 2/2015 | Hoellwarth |
| (Continued) | | |

FOREIGN PATENT DOCUMENTS

| CN | 203838407 U | * | 9/2014 |
|---|---|---|---|
| EP | 3287837 A1 | | 2/2018 |
| (Continued) | | | |

OTHER PUBLICATIONS

European Patent Office, "European Search Report," Application No. EP18210070.1, dated May 28, 2019, 9 pages.

(Continued)

*Primary Examiner* — Deeprose Subedi

(57) ABSTRACT

A head mounted augmented reality apparatus is provided having a frame, a band structure removably coupled to the frame, and a first cartridge removably coupled to a portion of the frame. First cartridge can hold the display such that when the first cartridge is coupled to the portion of the frame and holding the display, the display is oriented to face away from the frame at a selected angle. They cover structure is provided that removably attaches to a portion of either the frame or the first cartridge. A visor removably attaches to the cover structure and is disposed such that a surface of the visor reflects an image displayed on the display back toward the frame.

20 Claims, 14 Drawing Sheets

(56) References Cited

U.S. PATENT DOCUMENTS

| | | |
|---|---|---|
| 2013/0163090 A1 | 6/2013 | Yu |
| 2014/0152531 A1 | 6/2014 | Murray et al. |
| 2015/0253574 A1* | 9/2015 | Thurber ............. G02B 27/0172 |
| | | 359/630 |
| 2015/0260993 A1 | 9/2015 | Bickerstaff et al. |
| 2016/0062125 A1 | 3/2016 | Baek et al. |
| 2016/0180591 A1 | 6/2016 | Shiu et al. |
| 2016/0254681 A1 | 9/2016 | Choi et al. |
| 2016/0259169 A1 | 9/2016 | Smith et al. |
| 2016/0349509 A1 | 12/2016 | Lanier et al. |
| 2017/0017088 A1 | 1/2017 | Murray et al. |
| 2017/0153672 A1 | 6/2017 | Shin et al. |
| 2017/0337737 A1 | 11/2017 | Edwards et al. |

FOREIGN PATENT DOCUMENTS

| | | |
|---|---|---|
| JP | 2015-106915 A | 6/2015 |
| KR | 10-20120124194 A | 11/2012 |
| KR | 10-20170116809 A | 10/2017 |
| KR | 10-20170136342 A | 12/2017 |
| WO | 2014108693 A1 | 1/2014 |

OTHER PUBLICATIONS

ISA/KR, "International Search Report," International Application No. PCT/KR2018/015236, dated Mar. 12, 2019, 3 pages.

* cited by examiner

SYSTEM AND METHOD FOR HMD CONFIGURABLE FOR VARIOUS MOBILE DEVICE SIZES

This application claims priority under 35 U.S.C. § 119(e) to U.S. Provisional Patent Application No. 62/594,483 filed on Dec. 4, 2017. The above-identified provisional patent application is hereby incorporated by reference in its entirety.

TECHNICAL FIELD

This disclosure relates generally to wearable virtual reality (VR) and augmented reality (AR) devices. More specifically, this disclosure relates to systems and methods of head mountable displays that can incorporate various mobile device sizes.

BACKGROUND

Typically, head mounted devices (HMDs) that incorporate a removable mobile device are designed to operate with a single size mobile device type. Augmented reality HMDs often use smartphones as the computational and display unit, yet are limited to a single size smartphone. Only being able to use one size smartphone creates difficulties for a user who changes mobile devices or would like to share the HMD with other users who have different smart phone sizes and form factors.

SUMMARY

This disclosure provides embodiments of systems and methods for a HMD configurable for various mobile device sizes. In an embodiment of the disclosure, the system and method can support and augmented reality (AR) HMD that can use a display of a mobile device as an image-projection source. As users may have mobile devices of different sizes, embodiments of this disclosure can provide an AR HMD frame that can accommodate and removably incorporate various size mobile devices and smartphones.

In a first embodiment a head mounted apparatus is provided. The head mounted apparatus includes a frame, a band structure removably coupled to the frame and a first cartridge that is removably coupled to a portion of the frame. The first cartridge is configured to hold up display. When the first cartridge is coupled to the portion of the frame and is holding the display, the display is oriented to face away from the frame at a selected angle. The head mounted apparatus also includes a cover structure that can be removably attached to a portion of at least one of the frame and the first cartridge. The head mounted apparatus has a visor that is removably attached to the cover structure and disposed such that a surface of visor is configured to reflect an image displayed on the display in a direction toward the frame.

In a second embodiment, the method of providing a head mounted device (HMD) is provided. The method includes providing a frame and providing a band structure removably coupled to the frame. The first cartridge is removably coupled to portion of the frame. The first cartridge can hold a display such that when the first cartridge is coupled to the portion of the frame and is holding the display, the display is oriented to face away from the frame at a selected angle. The method further includes providing a cover structure that is removably attached to a portion of either the frame or the first cartridge. A visor is provided that is removably attached to the cover structure and disposed such that a surface of the visor reflection image displayed on the display toward the frame.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," "may include," "can have," or "can include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic accessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the electronic device can be a smart home appliance. Examples of the smart home appliance can include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™ APPLE TV™, or GOOGLE TV™), a gaming console (XBOX™, PLAYSTATION™), an electronic dictionary, an electronic key, a camcorder, or an electronic picture frame.

According to certain embodiments of the present disclosure, examples of the electronic device can include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the electronic device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the electronic device is one or a combination of the above-listed devices. According to embodiments of the present disclosure, the electronic device is a flexible electronic device. The electronic device disclosed herein is not limited to the above-listed devices, and can include new electronic devices depending on the development of technology.

As used herein, the term "user" may denote a human or another device (e.g., an artificial intelligent electronic device) using the electronic device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 13, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
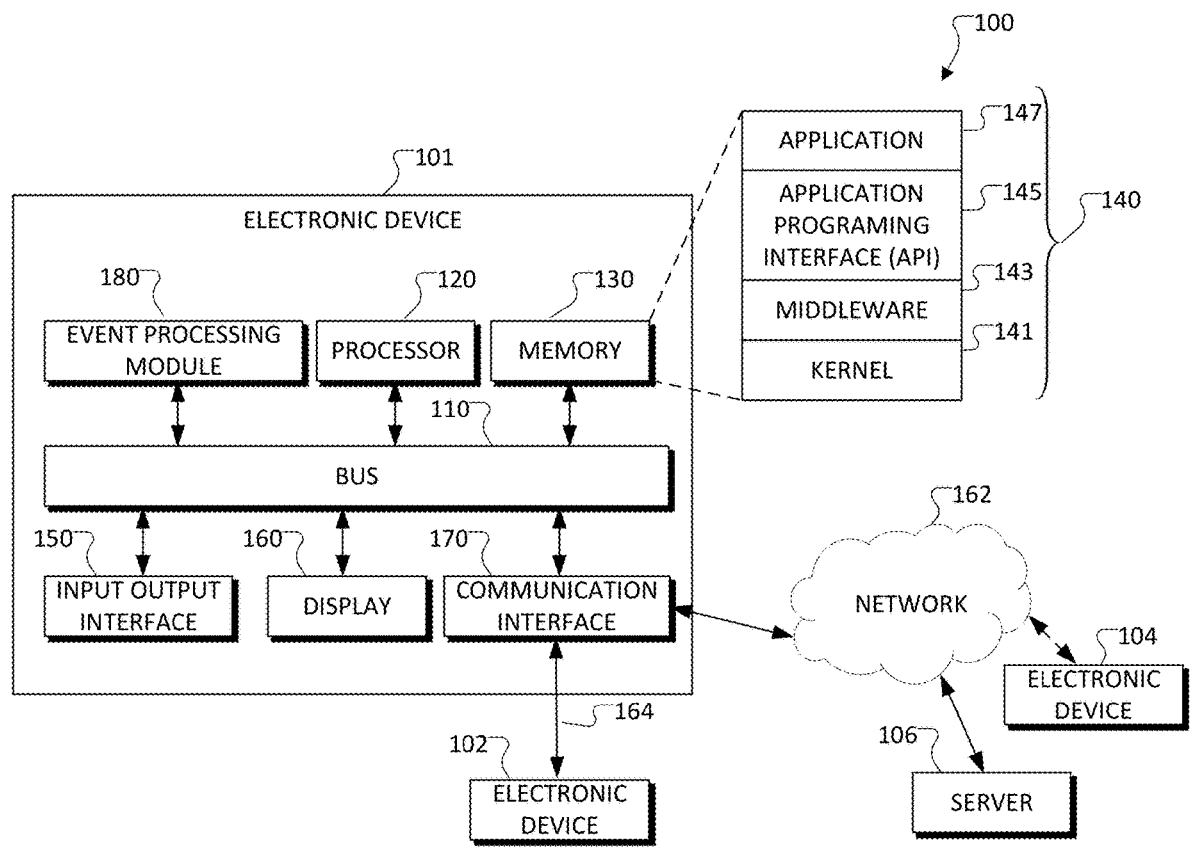
FIG. 1 illustrates an example of a network configuration according to an embodiment of this disclosure.

FIG. 1 illustrates an example network configuration 100 according to various embodiments of the present disclosure. The embodiment of the network configuration 100 shown in FIG. 1 is for illustration only. Other embodiments of the network configuration 100 could be used without departing from the scope of this disclosure.

According to certain embodiments of the present disclosure, an electronic device 101 is included in a network environment 100. The electronic device 101 can include at least one of a bus 110, a processor 120, a memory 130, an input/output (IO) interface 150, a display 160, a communication interface 170, event processing module 180, or sensors. In some embodiments, the electronic device 101 can exclude at least one of the components or can add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

For example, the processor 120 can receive a plurality of frames captured by the camera during a capture event. The processor 120 can identify a salient region in each of the plurality of frames. The processor 120 can determine a reference frame from the plurality of frames based on the identified salient regions. The processor 120 can fuse non-reference frames with the determined reference frame into a completed frame. The processor 120 can operate the display to display the completed frame.

The memory 130 can include a volatile and/or non-volatile memory. For example, the memory 130 can store commands or data related to at least one other component of the electronic device 101. According to certain embodiments of the present disclosure, the memory 130 can store software and/or a program 140. The program 140 includes, e.g., a kernel 141, middleware 143, an application programming interface (API) 145, and/or an application program (or "application") 147. At least a portion of the kernel 141, middleware 143, or API 145 can be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 134.

The API 145 is an interface allowing the application 147 to control functions provided from the kernel 141 or the middleware 143. For example, the API 145 includes at least one interface or function (e.g., a command) for filing control, window control, image processing, or text control.

The IO interface 150 serve as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

For example, the communication interface 170 is able to set up communication between the electronic device 101 and an external electronic device (e.g., a first electronic device 102, a second electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as video feeds or video streams.

Electronic device 101 further includes one or more sensors that can meter a physical quantity or detect an activation state of the electronic device 101 and convert metered or detected information into an electrical signal. For example, sensor can include one or more buttons for touch input, a camera, a gesture sensor, a gyroscope or gyro sensor, an air pressure sensor, a magnetic sensor or magnetometer, an acceleration sensor or accelerometer, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) can further include a control circuit for controlling at least one of the sensors included therein. Any of these sensor(s) can be located within the electronic device 101. A camera sensor can capture a plurality of frames for a single image to be combined by the processor 120.

The first external electronic device 102 or the second external electronic device 104 can be a wearable device or an electronic device 101-mountable wearable device (e.g., a head mounted display (HMD)). When the electronic device 101 is mounted in a HMD (e.g., the electronic device 102), the electronic device 101 is able to detect the mounting in the HMD and operate in a virtual reality mode. When the electronic device 101 is mounted in the electronic device 102 (e.g., the HMD), the electronic device 101 can communicate with the electronic device 102 through the communication interface 170. The electronic device 101 can be directly connected with the electronic device 102 to communicate with the electronic device 102 without involving with a separate network.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks, e.g., a computer network (e.g., local area network (LAN) or wide area network (WAN)), Internet, or a telephone network.

The first and second external electronic devices 102 and 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic devices 102 and 104 or server 106). According to certain embodiments of the present disclosure, when the electronic device 101 should perform some function or service automatically or at a request, the electronic device 101, instead of executing the function or service on its own or additionally, can request another device (e.g., electronic devices 102 and 104 or server 106) to perform at least some functions associated therewith. The other electronic device (e.g., electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique can be used, for example.

Although FIG. 1 shows that the electronic device 101 includes the communication interface 170 to communicate with the external electronic device 104 or server 106 via the network 162, the electronic device 101 can be independently operated without a separate communication function, according to certain embodiments of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

For example, the event processing server module can include at least one of the components of the event processing module 180 and perform (or instead perform) at least one of the operations (or functions) conducted by the event processing module 180.

The event processing module 180 can process at least part of information obtained from other elements (e.g., the processor 120, the memory 130, the input/output interface 150, or the communication interface 170) and can provide the same to the user in various manners.

For example, according to certain embodiments of the present disclosure, the event processing module 180 processes information related to an event, which is generated while the electronic device 101 is mounted in a wearable device (e.g., the electronic device 102) to function as a display apparatus and to operate in the virtual reality mode, to fit the virtual reality mode and display the processed information. When the event generated while operating in the virtual reality mode is an event related to running an application, the event processing module 180 can block the running of the application or process the application to operate as a background application or process. Additional information on the event processing module 180 may be provided through FIG. 2 described below.

Although in FIG. 1 the event processing module 180 is shown to be a module separate from the processor 120, at least a portion of the event processing module 180 can be included or implemented in the processor 120 or at least one other module, or the overall function of the event processing module 180 can be included or implemented in the processor 120 shown or another processor. The event processing module 180 can perform operations according to embodiments of the present disclosure in interoperation with at least one program 140 stored in the memory 130.

Figure 2:
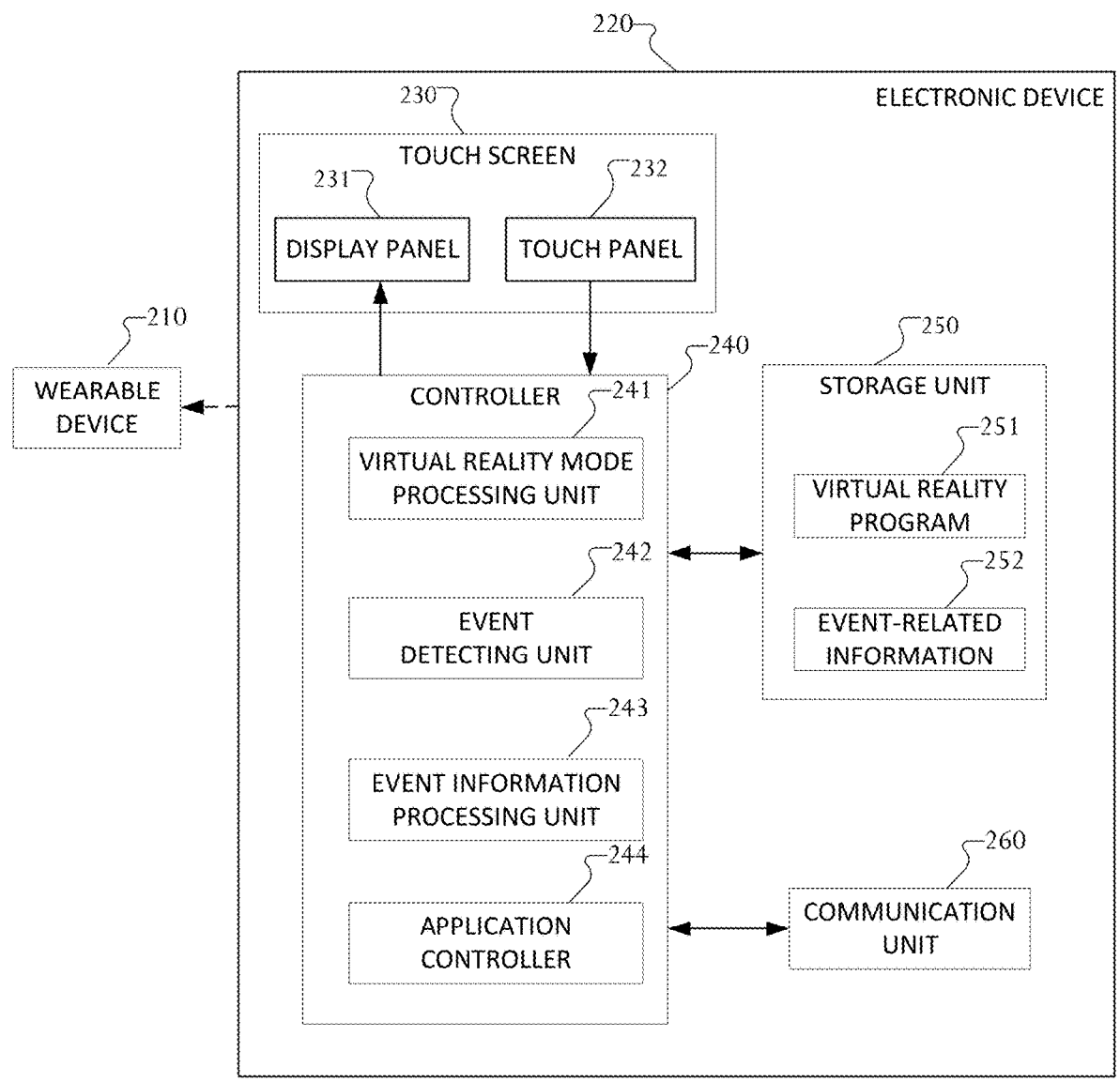
FIG. 2 is a block diagram of an example configuration of an electronic device according to an embodiment of this disclosure.

FIG. 2 illustrates an example electronic device 220 according to various embodiments of the present disclosure. The embodiment of the electronic device 220 shown in FIG. 2 is for illustration only. Other embodiments of the electronic device 220 could be used without departing from the scope of this disclosure. Further, the embodiment described in connection with FIG. 2 can be applied to multiple scenarios such as virtual reality (VR) augmented reality (AR), mixed reality, etc. Collectively the various reality scenarios can be referenced herein as cross reality (XR).

FIG. 2 is a block diagram illustrating an example configuration of an electronic device according to certain embodiments of the present disclosure. Referring to FIG. 2, the electronic device 220 according to certain embodiments of the present disclosure can be an electronic device 220 having at least one display. In the following description, the electronic device 220 can be a device primarily performing a display function or can denote a normal electronic device including at least one display. For example, the electronic device 220 can be an electronic device (e.g., a smartphone) having a touchscreen 230.

According to certain embodiments of the present disclosure, the electronic device 220 can include at least one of a touchscreen 230, a controller 240, a storage unit 250, or a communication unit 260. The touchscreen 230 can include a display panel 231 and/or a touch panel 232. The controller 240 can include at least one of a virtual reality mode processing unit 241, an event determining unit 242, an event information processing unit 243, or an application controller 244.

For example, when the electronic device 220 is mounted in a wearable device 210, the electronic device 220 can operate, e.g., as an HMD, and run a virtual reality mode. Further, according to certain embodiments of the present disclosure, even when the electronic device 220 is not mounted in the wearable device 210, the electronic device 220 can run the virtual reality mode according to the user's settings or run a virtual reality mode related application. In the following embodiment, although the electronic device 220 is set to be mounted in the wearable device 210 to run the virtual reality mode, embodiments of the present disclosure are not limited thereto.

According to certain embodiments of the present disclosure, when the electronic device 220 operates in the virtual reality mode (e.g., the electronic device 220 is mounted in the wearable device 210 to operate in a head mounted theater (HMT) mode), two screens corresponding to the user's eyes (left and right eye) can be displayed through the display panel 231.

According to certain embodiments of the present disclosure, when the electronic device 220 is operated in the virtual reality mode, the controller 240 can control the processing of information related to an event generated while operating in the virtual reality mode to fit in the virtual reality mode and display the processed information. According to certain embodiments of the present disclosure, when the event generated while operating in the virtual reality mode is an event related to running an application, the controller 240 can block the running of the application or process the application to operate as a background process or application.

More specifically, according to certain embodiments of the present disclosure, the controller 240 can include at least one of a virtual reality mode processing unit 241, an event determining unit 242, an event information processing unit 243, or an application controller 244 to perform functions according to various embodiments of the present disclosure. An embodiment of the present disclosure can be implemented to perform various operations or functions as described below using at least one component of the electronic device 220 (e.g., the touchscreen 230, controller 240, or storage unit 250).

According to certain embodiments of the present disclosure, when the electronic device 220 is mounted in the wearable device 210 or the virtual reality mode is run according to the user's setting or as a virtual reality mode-related application runs, the virtual reality mode processing unit 241 can process various functions related to the operation of the virtual reality mode. The virtual reality mode processing unit 241 can load at least one virtual reality program 251 stored in the storage unit 250 to perform various functions.

The event detecting unit 242 determines or detects that an event is generated while operated in the virtual reality mode by the virtual reality mode processing unit 241. Further, the event detecting unit 242 can determine whether there is information to be displayed on the display screen in relation with an event generated while operating in the virtual reality mode. Further, the event detecting unit 242 can determine that an application is to be run in relation with an event generated while operating in the virtual reality mode. Various embodiments of an application related to the type of event are described below.

The event information processing unit 243 can process the event-related information to be displayed on the display screen to fit the virtual reality mode when there is information to be displayed in relation with an event occurring while operating in the virtual reality mode depending on the result of determination by the event detecting unit 242. Various methods for processing the event-related information can apply. For example, when a three-dimensional (3D) image is implemented in the virtual reality mode, the electronic device 220 converts the event-related information to fit the 3D image. For example, event-related information being displayed in two dimensions (2D) can be converted into left and right eye information corresponding to the 3D image, and the converted information can then be synthesized and displayed on the display screen of the virtual reality mode being currently run.

When it is determined by the event detecting unit 242 that there is an application to be run in relation with the event occurring while operating in the virtual reality mode, the application controller 244 performs control to block the running of the application related to the event. According to certain embodiments of the present disclosure, when it is determined by the event detecting unit 242 that there is an application to be run in relation with the event occurring while operating in the virtual reality mode, the application controller 244 can perform control so that the application is run in the background so as not to influence the running or screen display of the application corresponding to the virtual reality mode when the event-related application runs.

The storage unit 250 can store a virtual reality program 251. The virtual reality program 251 can be an application related to the virtual reality mode operation of the electronic device 220. The storage unit 250 can also store the event-related information 252. The event detecting unit 242 can reference the event-related information 252 stored in the storage unit 250 in order to determine whether the occurring event is to be displayed on the screen or to identify information on the application to be run in relation with the occurring event.

The wearable device 210 can be an electronic device including at least one function of the electronic device 101 shown in FIG. 1, and the wearable device 210 can be a wearable stand to which the electronic device 220 can be mounted. In case the wearable device 210 is an electronic device, when the electronic device 220 is mounted on the wearable device 210, various functions can be provided through the communication unit 260 of the electronic device 220. For example, when the electronic device 220 is mounted on the wearable device 210, the electronic device 220 can detect whether to be mounted on the wearable device 210 for communication with the wearable device 210 and can determine whether to operate in the virtual reality mode (or an HMT mode).

According to certain embodiments of the present disclosure, upon failure to automatically determine whether the electronic device 220 is mounted when the communication unit 220 is mounted on the wearable device 210, the user can apply various embodiments of the present disclosure by running the virtual reality program 251 or selecting the virtual reality mode (or, the HMT mode). According to certain embodiments of the present disclosure, when the wearable device 210 functions with or as part the electronic device 101, the wearable device can be implemented to automatically determine whether the electronic device 220 is mounted on the wearable device 210 and enable the running mode of the electronic device 220 to automatically switch to the virtual reality mode (or the HMT mode).

At least some functions of the controller 240 shown in FIG. 2 can be included in the event processing module 180 or processor 120 of the electronic device 101 shown in FIG. 1. The touchscreen 230 or display panel 231 shown in FIG. 2 can correspond to the display 160 of FIG. 1. The storage unit 250 shown in FIG. 2 can correspond to the memory 130 of FIG. 1.

Although in FIG. 2 the touchscreen 230 includes the display panel 231 and the touch panel 232, according to certain embodiments of the present disclosure, the display panel 231 or the touch panel 232 may also be provided as a separate panel rather than being combined in a single touchscreen 230. Further, according to certain embodiments of the present disclosure, the electronic device 220 can include the display panel 231, but exclude the touch panel 232.

In certain examples of the present disclosure, the electronic device 220 can be denoted as a first device (or a first electronic device), and the wearable device 210 may be denoted as a second device (or a second electronic device) for ease of description.

According to certain embodiments of the present disclosure, an electronic device includes a display unit displaying on a screen corresponding to a virtual reality mode and a controller performing control that detects an interrupt according to certain embodiments of at least one event, that varies event-related information related to the event in a form corresponding to the virtual reality mode, and that displays the varied event-related information on the display screen that corresponds to the virtual reality mode.

According to certain embodiments of the present disclosure, the event can include any one or more selected from among a call reception event, a message reception event, an alarm notification, a scheduler notification, a wireless fidelity (Wi-Fi) connection, a WiFi disconnection, a low battery notification, a data permission or use restriction notification, a no application response notification, or an abnormal application termination notification.

According to certain embodiments of the present disclosure, the electronic device further comprises a storage unit configured for storing the event-related information when the event is not an event to be displayed in the virtual reality mode, wherein the controller can perform control to display the event-related information stored in the storage unit when the electronic device switches from the virtual reality mode into a see-through mode.

According to certain embodiments of the present disclosure, the electronic device further includes a storage unit that stores information regarding at least one event to be displayed in the virtual reality mode.

According to certain embodiments of the present disclosure, the event includes an instant message reception notification event.

According to certain embodiments of the present disclosure, when the event is an event related to running at least one application, the controller can perform control that blocks running of the application according to occurrence of the event.

According to certain embodiments of the present disclosure, the controller can perform control to run the blocked application when a screen mode of the electronic device switches from the virtual reality mode into a see-through mode.

According to certain embodiments of the present disclosure, when the event is an event related to running at least one application, the controller can perform control that enables the application, according to the occurrence of the event, to be run on a background of a screen of the virtual reality mode.

According to certain embodiments of the present disclosure, when the electronic device is connected with a wearable device, the controller can perform control to run the virtual reality mode.

According to certain embodiments of the present disclosure, the controller can enable the event-related information to be arranged and processed to be displayed in a three dimensional (3D) space of the virtual reality mode screen being displayed on a current display screen.

According to certain embodiments of the present disclosure, the electronic device can include additional sensors such as one or more red, green, blue (RGB) cameras, dynamic vision sensor (DVS) cameras, 360 degree cameras, or a combination thereof.

Figure 3:
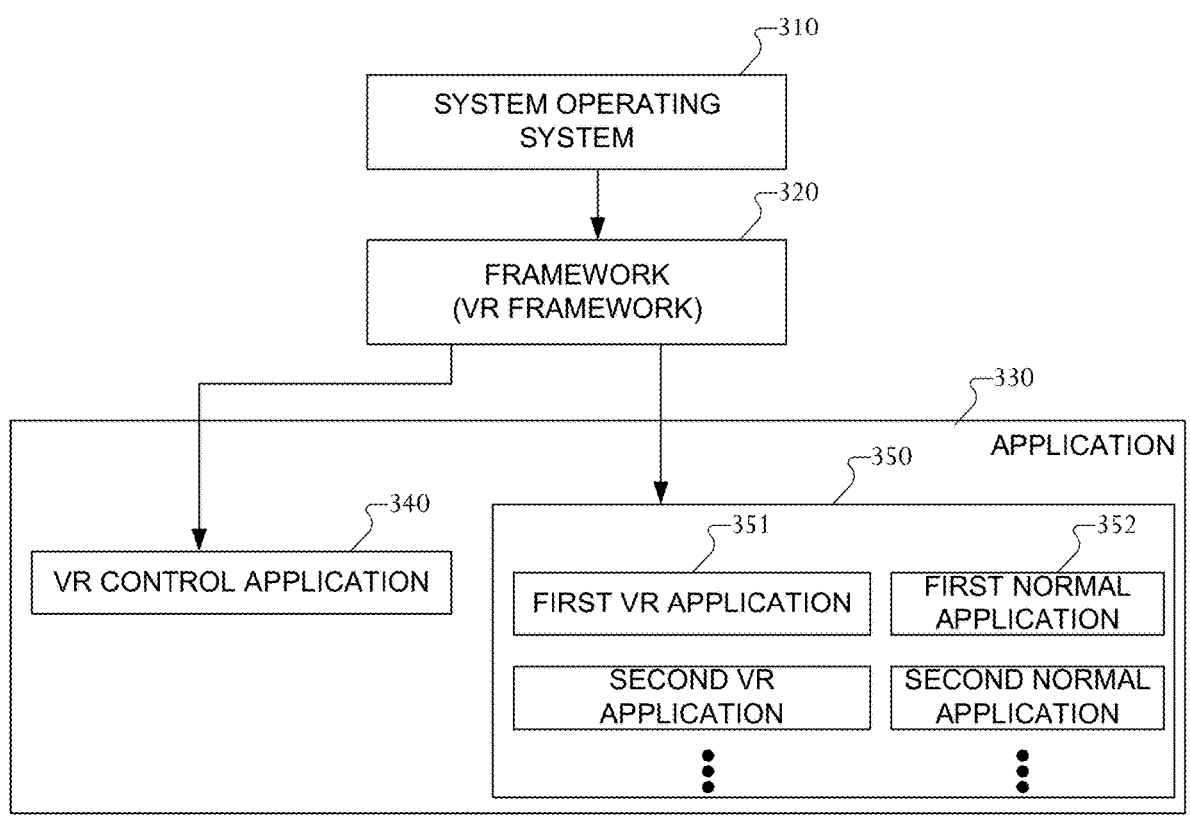
FIG. 3 is a block diagram that illustrates a program module according to an embodiment of this disclosure.

FIG. 3 is a block diagram illustrating a program module according to certain embodiments of the present disclosure. Referring to FIG. 3, the program module can include a system operating system (e.g., an OS) 310, a framework 320, and an application 330.

The system operating system 310 can include at least one system resource manager or at least one device driver. The system resource manager can perform, for example, control, allocation, or recovery of the system resources. The system resource manager may include at least one manager, such as a process manager, a memory manager, or a file system manager. The device driver may include at least one driver, such as, for example, a display driver, a camera driver, a Bluetooth driver, a shared memory driver, a USB driver, a keypad driver, a Wi-Fi driver, an audio driver, or an inter-process communication (IPC) driver.

According to certain embodiments of the present disclosure, the framework 320 (e.g., middleware) can provide, for example, functions commonly required by an application or provide the application with various functions through an application programming interface (API) to allow the application to efficiently use limited system resources inside the electronic device.

The VR framework included in the framework 320 can control functions related to virtual reality mode operations on the electronic device. For example, when running a virtual reality mode operation, the VR framework 320 can control at least one VR application 351, which is related to virtual reality, among applications 330 so as to provide the virtual reality mode on the electronic device.

The application 330 can include a plurality of applications and can include at least one VR application 351 running in the virtual reality mode and at least one normal application 352 running in a normal mode, which is not the virtual reality mode.

The application 330 can further include a VR control application 340. An operation of the at least one VR application 351 and/or at least one normal application 352 can be controlled under the control of the VR control application 340.

When at least one event occurs while the electronic device operates in the virtual reality mode, the system operating system 310 can notify the framework 320, for example the VR framework, of an occurrence of an event.

The framework 320 can then control the running of the normal application 352 so that event-related information can be displayed on the screen for the event occurring in the normal mode, but not in the virtual reality mode. When there is an application to be run in relation with the event occurring in the normal mode, the framework 320 can perform or provide control to run at least one normal application 352.

According to certain embodiments of the present disclosure, when an event occurs while operating in the virtual reality mode, the framework 320, for example the VR framework, can block the operation of at least one normal application 352 to display the information related to the occurring event. The framework 320 can provide the event occurring, while operating in the virtual reality mode, to the VR control application 340.

The VR control application 340 can process the information related to the event occurring while operating in the virtual reality mode to fit within the operation of the virtual reality mode. For example, a two-dimensional (2D), planar event-related information can be processed into 3D information.

The VR control application 340 can control at least one VR application 351 currently running and can perform control to synthesize the processed event-related information for display on the screen being run by the VR application 351 and display the result of the event related information thereon.

According to certain embodiments of the present disclosure, when an event occurs while operating in the virtual reality mode, the framework 320 can perform control to block the running of at least one normal application 352 related to the occurring event.

According to certain embodiments of the present disclosure, when an event occurs while operating in the virtual reality mode, the framework 320 can perform control to temporarily block the running of at least one normal application 352 related to the occurring event, and then when the virtual reality mode terminates, the framework 320 can perform control to run the blocked normal application 352.

According to certain embodiments of the present disclosure, when an event occurs while operating in the virtual reality mode, the framework 320 can control the running of at least one normal application 352 related to the occurring event so that the at least one normal application 352 related to the event operates on the background so as not to influence the screen by the VR application 351 currently running.

Embodiments described in connection with FIG. 3 are examples for implementing an embodiment of the present disclosure in the form of a program, and embodiments of the present disclosure are not limited thereto and rather can be implemented in other various forms. Further, while the embodiment described in connection with FIG. 3 references VR, it can be applied to other scenarios such as augmented reality, mixed reality, etc. Collectively the various reality scenarios can be referenced herein as cross reality (XR).

Figure 4:
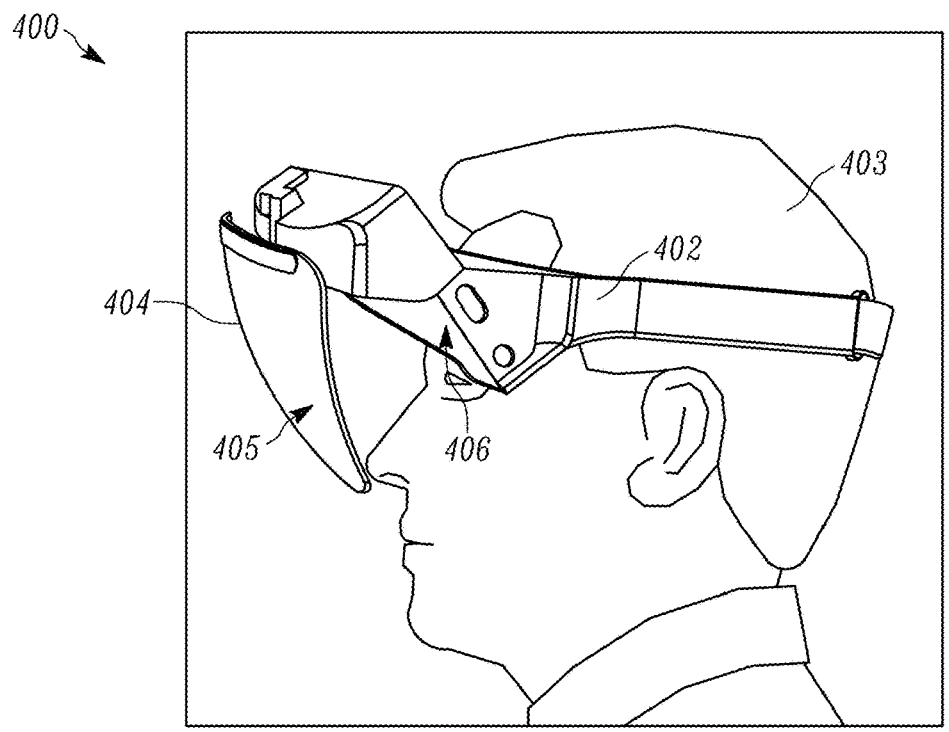
FIG. 4 illustrates an example of a head mounted display (HMD) for use in augmented reality, virtual reality or mixed reality according to an embodiment of this disclosure.

FIG. 4 illustrates an example embodiment of a head mounted display (HMD) 400 for use in augmented reality, virtual reality or mixed reality. The embodiment of the HMD 400 is for illustration only. Other embodiments could be used without departing from the scope of the present disclosure.

In the example shown in FIG. 4, the HMD 400 is shown being worn on a user's head 403. The HMD 400 can include a frame 402 and a visor (also described herein as a lens or glass) 404 detachably attached or fixed to a front portion of the frame 402. The HMD 400 also includes a mobile device 406 removably mounted or attached to the frame 402 as a display projection source. At least one image from the display of the mobile device 406 can be projected onto a user facing or frame facing surface 405 of the visor 404 such that the user can view the at least one image reflected from the frame facing visor surface 405 while the user can also see real world objects through the lens or visor 404. In some embodiments, the visor is manufactured from clear or transparent acrylic, polycarbonate or other reasonably equivalent or similar materials used in eyewear, eye visor and eye shielding products. Thus, transparent is defined herein as any range of transparency from completely transparent to semi-transparent through partially transparent. In some embodiments the transparency of the visor 404 can be changed based on ambient lighting or a signal provided to the visor 404 from the HMD 400.

Figure 5A:
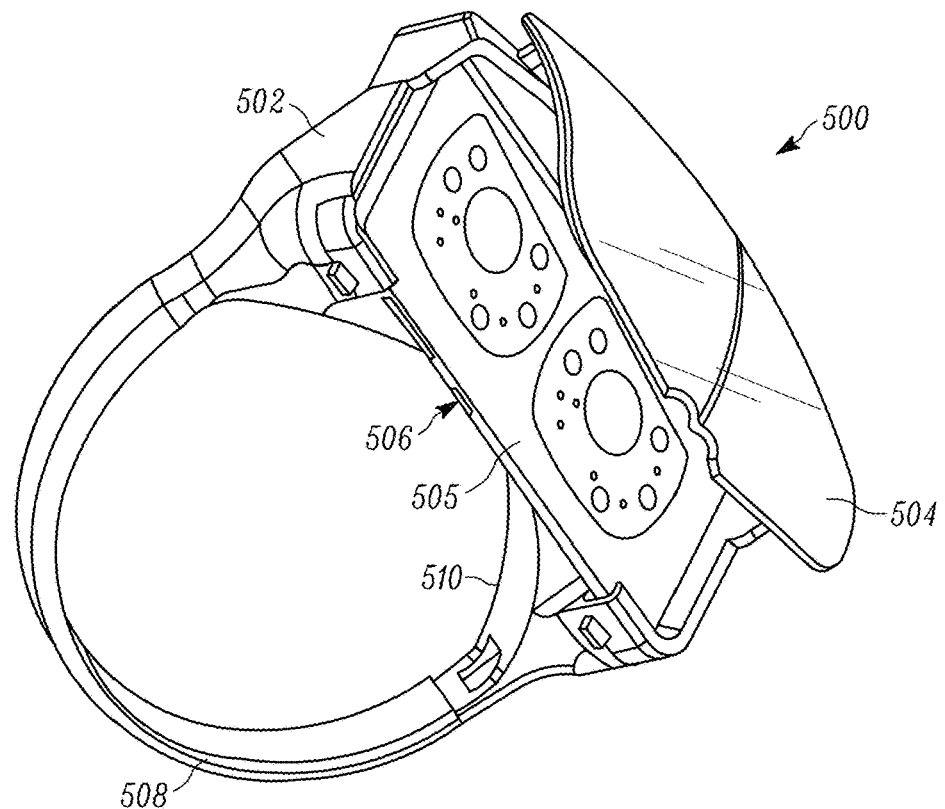
FIGS. 5A and 5B illustrate perspective views of an a HMD according to an embodiment of this disclosure.
Figure 5B:
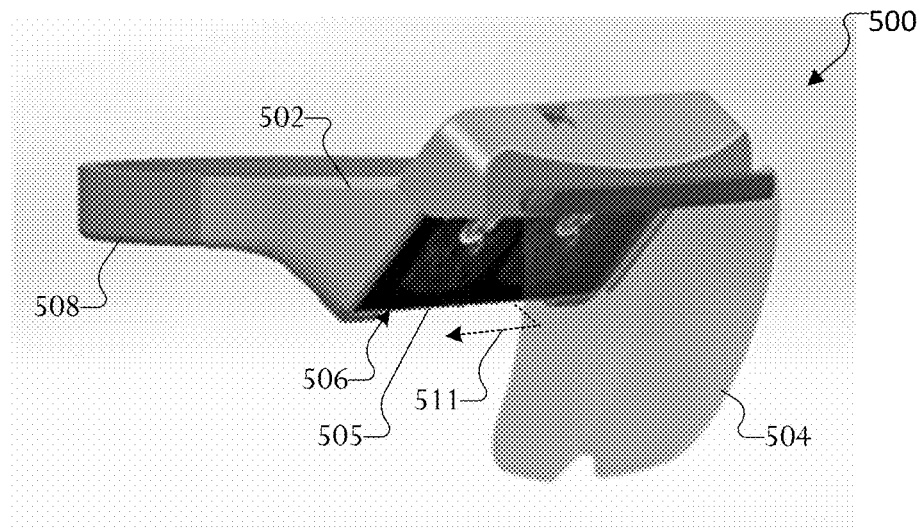

FIGS. 5A and 5B illustrate exemplary perspective views of an embodiment of the HMD 500. The embodiment of the HMD 500 is for illustration only and other embodiments could be used without departing from the scope of the present disclosure. In certain embodiments, the HMD 500 can be configured similar to, or the same as, HMD 400.

The HMD 500 includes a frame 502 and a visor 504 attached to a front upper portion of the frame 502. The visor 504 has one or more lenses that are transparent. A mobile device or smartphone 506 is shown installed into the HMD 500 such that the display 505 of the mobile device 506 is facing forward or away from the frame 502 at a selected angle. The display 505 faces toward an inner or frame facing surface of the visor 504 so that the image on the display 505 can be reflected 511 by the inner or frame facing visor surface toward the user's eyes, that is the image projected by display 505 is rendered to appear on the inner surface of visor 504. A headband 508 can attach to a left and right side of the frame 502. The headband 508 is configured to fit about the user's head and in conjunction with a forehead surface 510 of the frame 502, hold the HMD 500 steady on the user's head.

Figure 6:
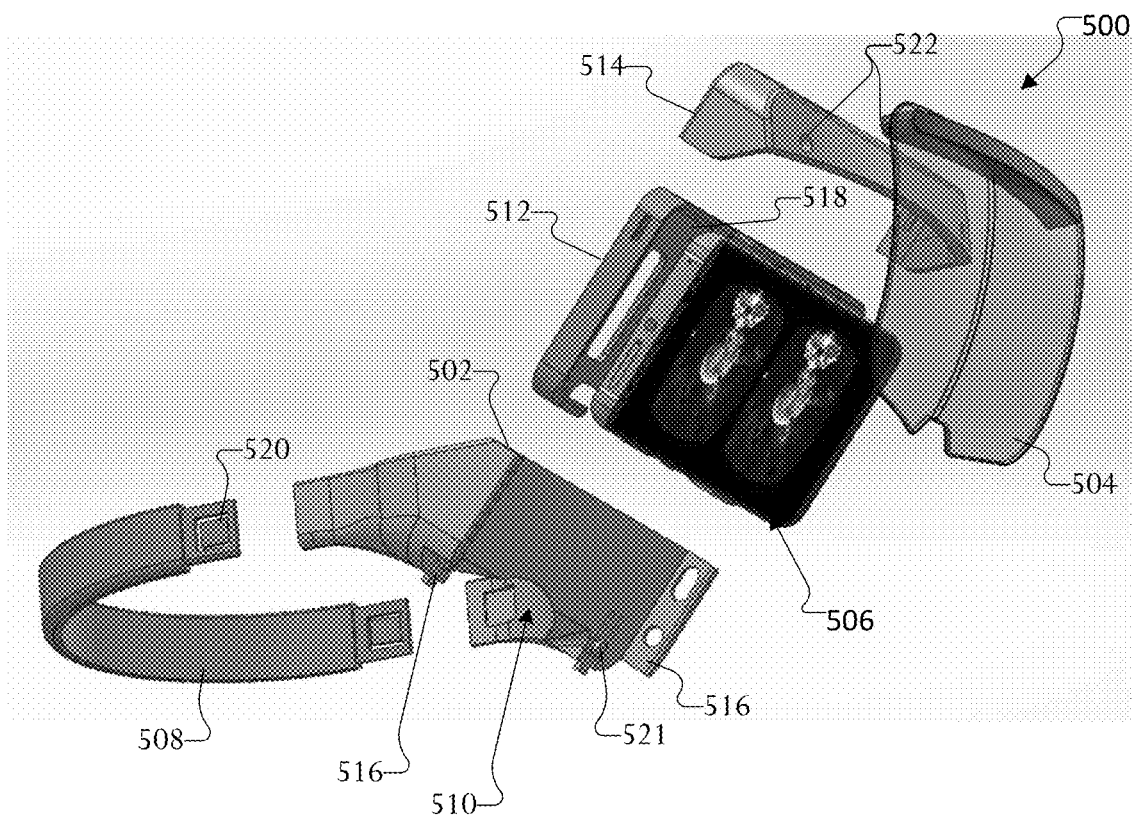
FIG. 6 illustrates an exploded view of an HMD according to an embodiment of this disclosure.

FIG. 6 depicts an illustration of an embodiment of the HMD 500 depicted in an exploded view. The AR HMD device 500 can include a frame 502, a visor 504, a removable mobile device 506, a headband or strap 508, a cartridge 512, and a cover 514. The frame 502 can include the strap 508 for securing the frame to a user's head. The strap 508 can be removably attachable to the frame 502 via tabs 520 or other reasonable attachment mechanism. A portion of the frame 502, the forehead surface 510, is designed to be in contact with a portion of user's head (e.g., forehead) when worn and is shaped accordingly. The frame structure 502 is configured to connect or attach to other portions or sections of the HMD device 500. As shown, a removably detachable cover 514, which can shade the inner surface of the visor 504 from overhead light, can in various embodiments also be considered part of the frame 502. The cartridge 512 can be shaped to hold or contain, in a recess 518, the mobile device 506. The cartridge 512, with or without the mobile device 506, can be detachably attached to the frame's structure. In some embodiments, the cartridge 512 can be removably attached, by sliding or snapping, to the frame 502 between a pair of brackets or slotted extensions 516 that extend from a front portion of the frame 502. The cartridge 512 includes a recess 518. The recess 518 is dimensioned and adapted to hold a mobile device 506 having a predetermined selected size. However, other interchangeable cartridges, not specifically shown, can have recesses with different dimensions such that the cartridges are interchangeable and different cartridges can accommodate mobile devices or displays of various different sizes. Such other interchangeable cartridges can also be detachably attached to the same frame structure brackets or cartridge holding slots 516, which allows users having different size mobile devices to use the same HMD frame 500. In the illustrated embodiment, the cartridge 512 can slide or snap into place in order to be attached or mounted to the HMD frame cartridge brackets or slots 516. In certain embodiments, different mounting mechanisms can removably hold the cartridge 512 in place. Such mounting mechanisms include, but are not limited to clasps, clamps, snaps, clips, tabs, notches, bump and hole, pressure fit, flexible clips, fasteners, slides, tongue and groove, or other similar or related attachment mechanisms. The visor or lens 504 may be detachably coupled to a front or the side portions of the cover 514 or other aspect location of the frame 502. The coupling 522 can use tabs, clips, fasteners, ratchet grip, magnets, adhesive, snap fit, hook and loop, or any other similar mechanism to attach the visor 504 to the cover 514. In certain embodiment magnets or other reusable mechanism may be utilized to attach the visor 504 to the frame 502 or cover 514.

Figure 7A:
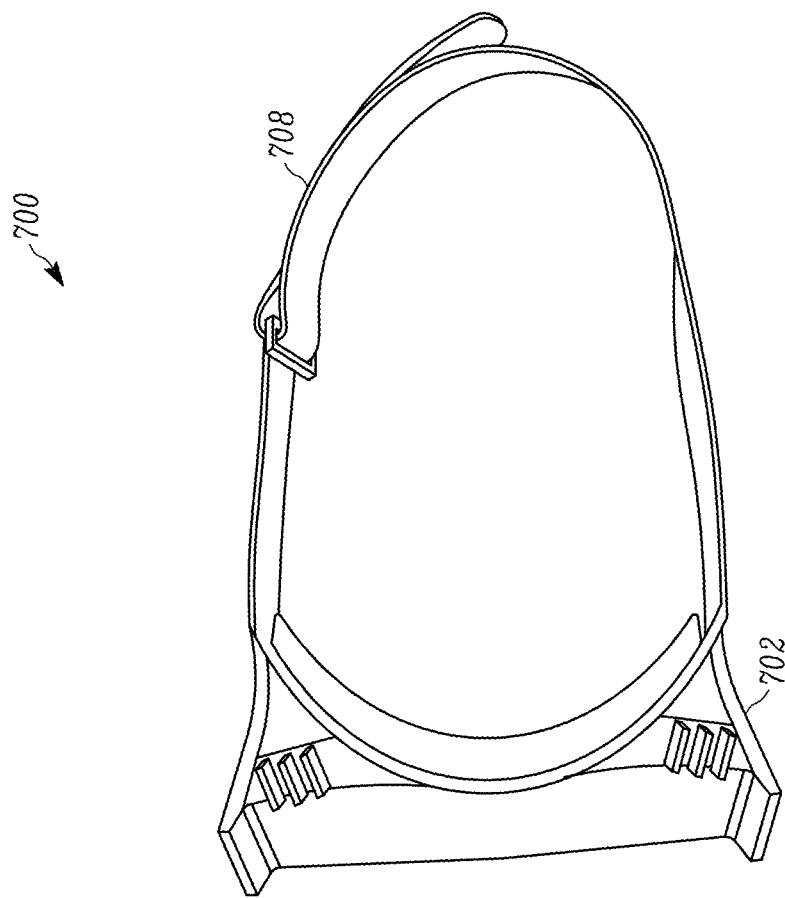
FIGS. 7A and 7B illustrate exploded top and bottom views, respectively, of an HMD according to an embodiment of this disclosure.
Figure 7A:
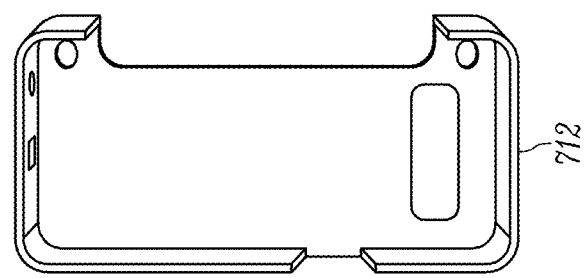
Figure 7A:
Figure 7B:
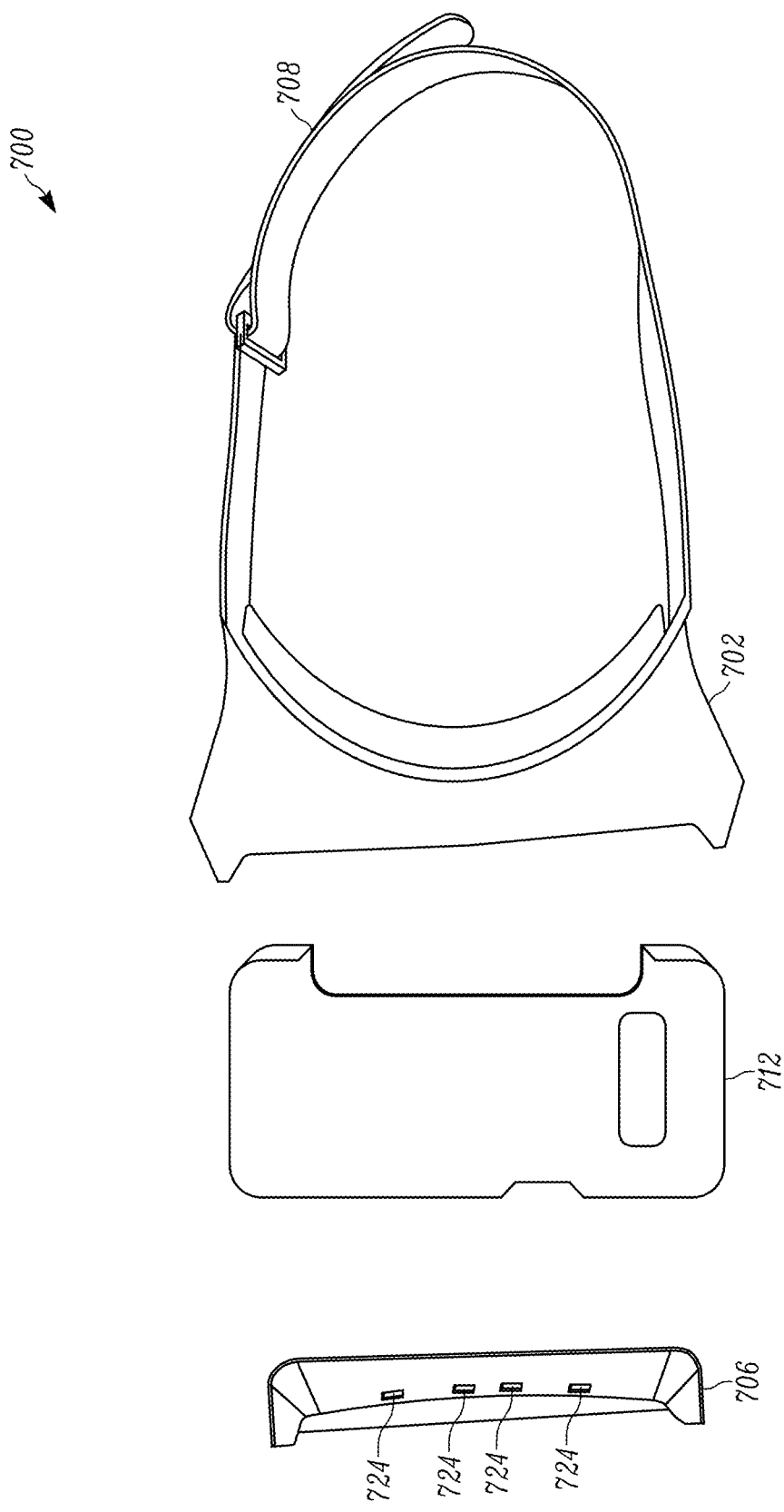

FIGS. 7A-7B illustrates another embodiment of the HMD 700 in top and bottom exploded views. The embodiment of the HMD 700 is for illustration only and other embodiments could be used without departing from the scope of the present disclosure. In certain embodiments, the HMD 700 can be configured similar to, or the same as, HMD 400.

In the example shown in FIG. 7A, the HMD's frame 702 is attached to an adjustable strap 708, a cartridge 712, and a cover 714. As described above with respect to FIG. 6 and also shown in FIG. 7B, the cover 714 may include magnetic elements 724 to removably couple or removably attach the visor to the cover 714.

Figure 8A:
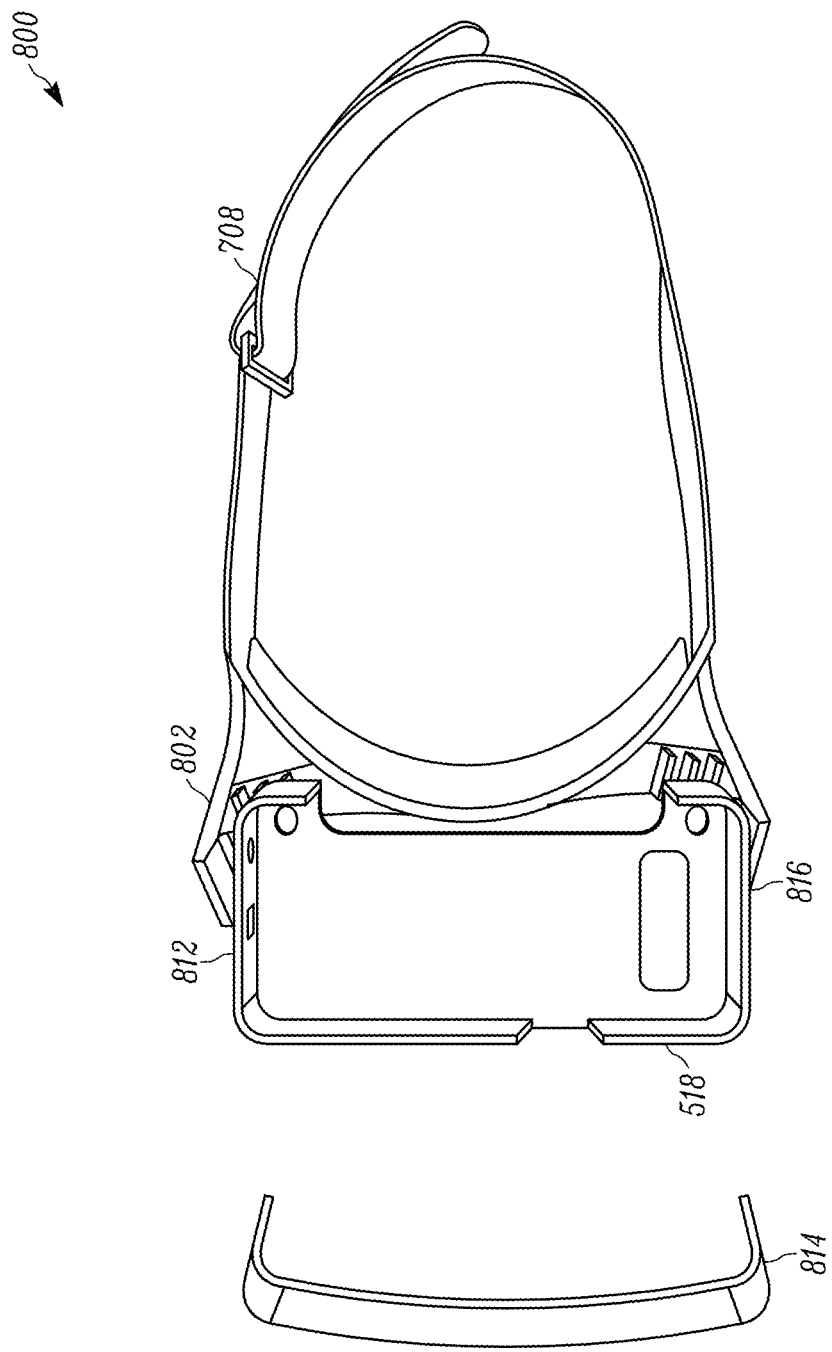
FIGS. 8A and 8B illustrate various views of a partially assembled HMD with a frame and a cartridge portion coupled together according to an embodiment of this disclosure.
Figure 8B:
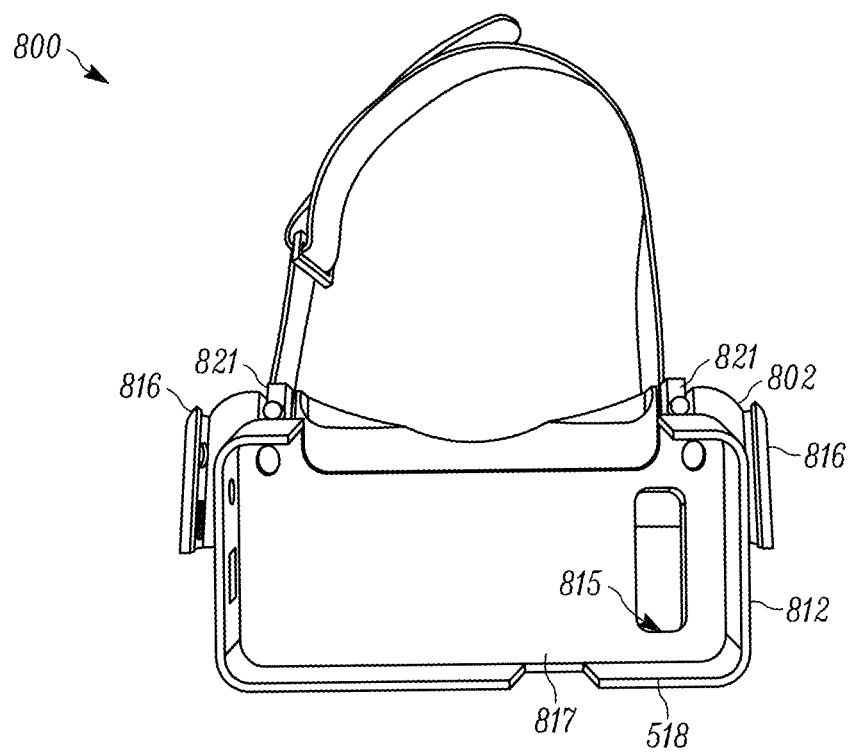

FIGS. 8A and 8B illustrate various views of a partially assembled HMD 800 were a frame 802 and cartridge 812 are removably coupled together. The cartridge 812 can be one of a plurality of cartridges having different sized recesses 518 in order to accommodate and hold different sized mobile devices therein. In some embodiments, a cut out or opening 815 is positioned on a bottom surface 817 of the cartridge 812. The opening 815 is also on the bottom of the recess 518 and is positioned to allow a backside camera or other backside sensors such as light, sound, humidity, or temperature sensors; or backside emitters, such as light emitters, sound emitters, or wireless emitters that are on the mobile device to be utilized by the mobile device installed in the cartridge 812 of the HMD 800.

A combination of the brackets or slots 816 and clip or clips 821 on the frame 802 engage with and hold the cartridge 812 in place when coupled with the frame 802.

Figure 9:
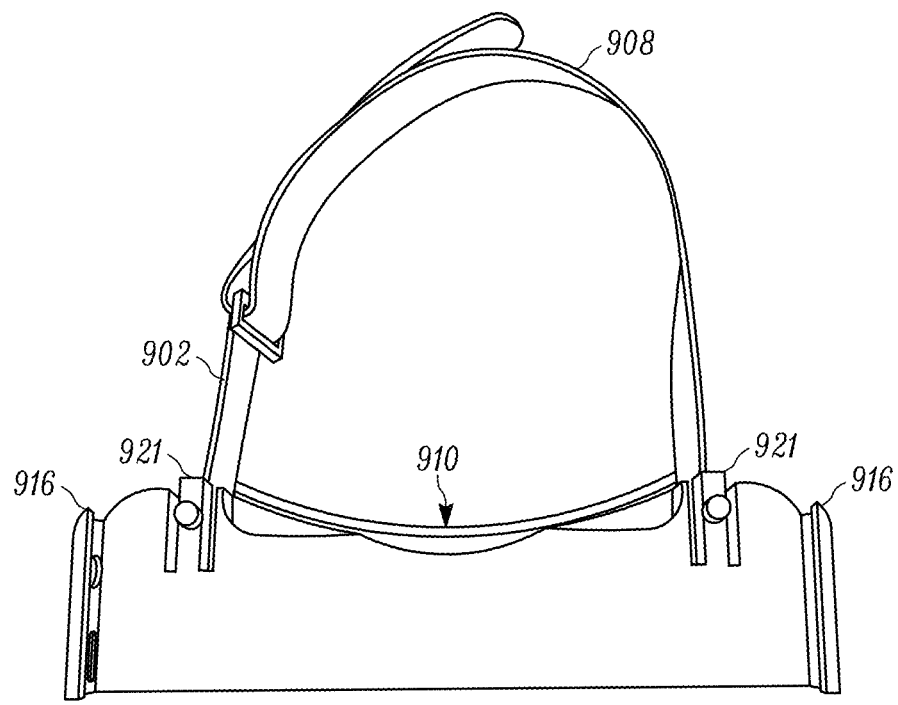
FIG. 9 illustrates a frame portion of an HMD according to an embodiment of this disclosure.

FIG. 9 illustrates an embodiment of an HMD frame 902. The embodiment of the HMD frame 902 is for illustration only and other embodiments could be used without departing from the scope of the present disclosure.

The frame 902 can include a frame portion or forehead surface 910 that is configured to contact with a user's forehead. The frame 902 can also include or be attached to a strap 908. The strap 908 can be adjustable. Optionally, other types of straps 908 can be used to removably hold the frame 902 to a user's head. A wraparound or elastic strap are merely two examples of a plurality of ways known in the art to secure the frame 902 to a user's head. Optionally, cushioning material may be utilized between the portion of the frame in contact with a user's head, the forehead surface 910, and the frame 902 itself. Such cushioning material may be felt, cloth, foam, memory foam, gel, or other similar material for user comfort. One or more clips 921 along with the side brackets or slots 916 are shown. The side brackets or slots 916, in some embodiments, enable the cartridge to slide into a correct position in the slots 916 and removably clip one of a plurality of cartridges into place on the frame 902. Each of the plurality of cartridges can have the same outer dimensions and recess areas of different sizes to accommodate mobile devices or display devices of different sizes.

Figure 10:
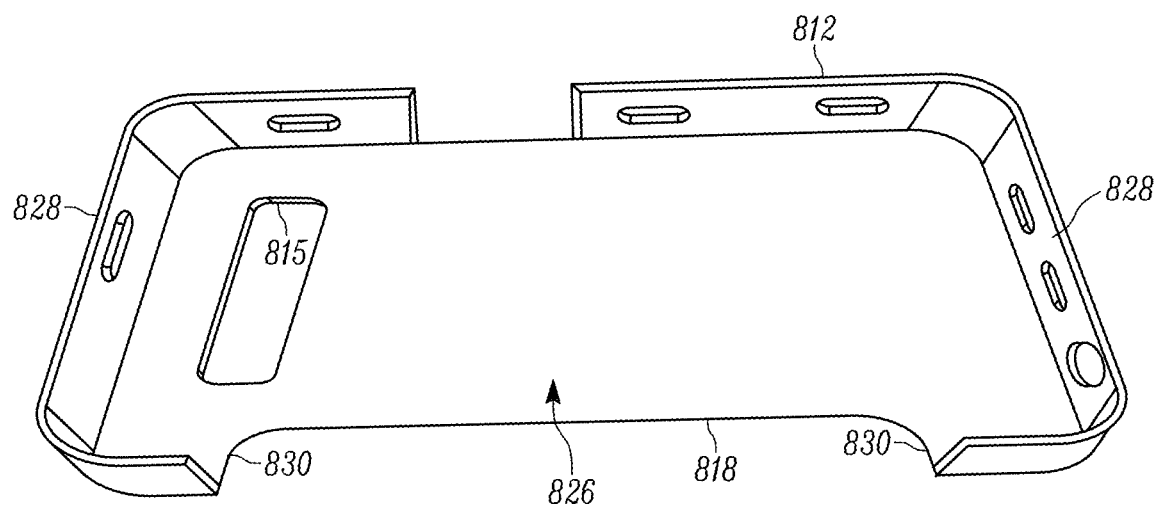
FIG. 10 illustrates a cartridge portion of an HMD according to an embodiment of this disclosure.

FIG. 10 illustrates a view of an exemplary cartridge 812 that is configured to hold a particular size mobile device in a recessed area 818. The cartridge 812 is removably attachable to the frame 802. The cartridge 812 has a structured recess 818 along with an opening 815 dimensioned for removably holding, containing and coupling with a particular size or model of mobile device or display. Other cartridges are designed and configured with different sized recesses areas 818 so as to couple with other mobile device models of different length, width, and thickness configurations. The other cartridges have exterior dimensions that are all the same so they all can be interchangeably attached or coupled to the HMD frame 802. The recess area 818 can be bounded by a cartridge or recess bottom surface 826 and sidewalls 828. The sidewalls 828 extend upward from the bottom surface 826 to define the recess area 818. The sidewalls 828 extend about at least a portion of a periphery of the recess bottom surface 826. The thickness of the sidewalls 828 may vary on different cartridges to accommodate different size mobile devices or displays.

A notch 830 or alternatively an indention or through hole can be positioned on the cartridge 812 to receive the clip 821, tab or other retaining mechanism on the frame 802. The coupling of the cartridge to the frame may use any of a variety of coupling means or configurations such as clips, tabs, fasteners, notches, brackets, slots, flexible members, snaps, straps, or keyed couplings to name a few.

Figure 11A:
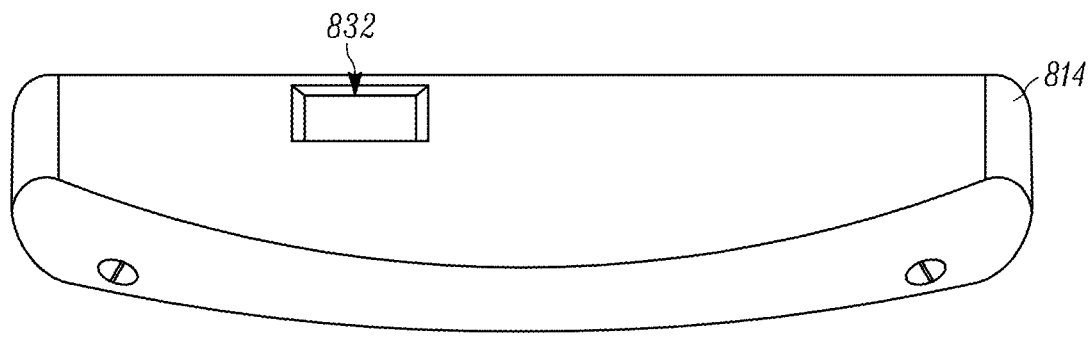
FIGS. 11A, 11B, and 11C illustrate various views of a cover portion of an HMD according to an embodiment of this disclosure.
Figure 11B:
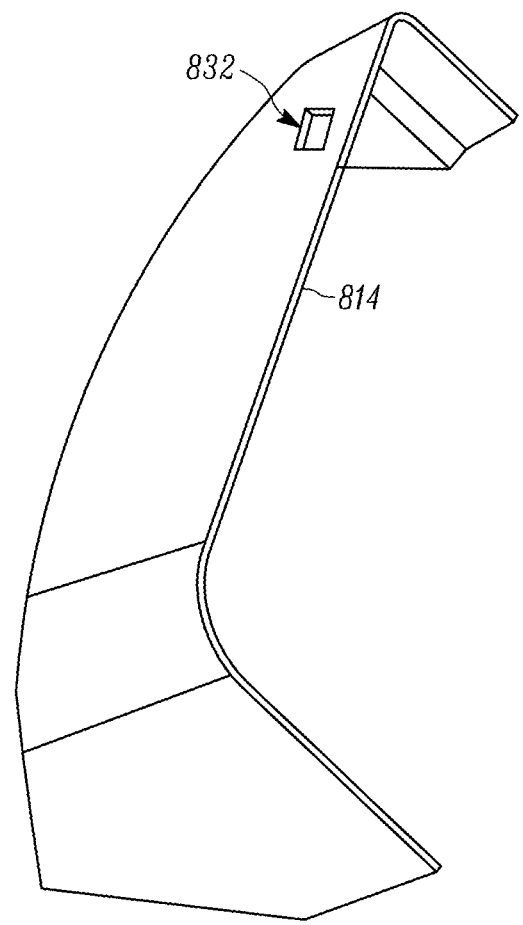
Figure 11C:
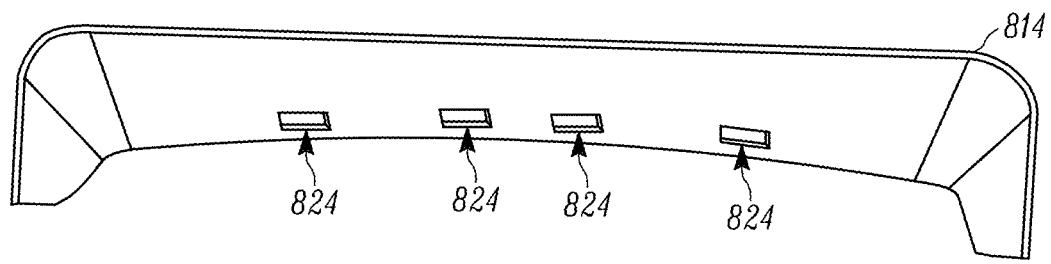

FIGS. 11A-11C illustrate top, perspective, and bottom views of an example cover 814, respectively. The cover 814 can removably attach to the frame 802 with clips, fasters, tabs, notches and the like. An opening 832 through a surface of the cover 814 can be placed to allow user access to one or more buttons or controls located on a side surface of a mobile device within a cartridge. For example, the opening 832 may allow user access an on/off button or control of the mobile device. In various embodiments the cover 814 can removably couple to the lens or visor portion of the HMD. FIG. 11C depicts a plurality of magnetic elements 824 that can removably couple the cover 814 to the lens or visor portion. The cover, when connected to the frame and visor shades the inner surface of the visor from extraneous light that may produce glare or unwanted reflections on the visor portion of the HMD.

Figure 12A:
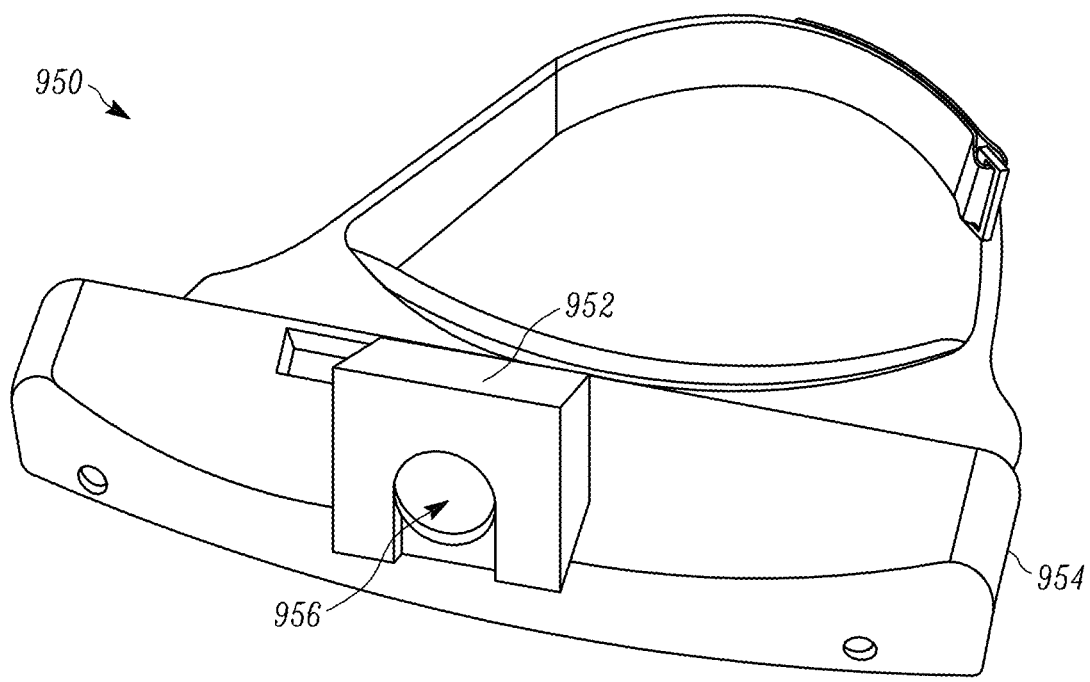
FIGS. 12A, 12B and 12C illustrate various views of a cover portion of an HMD according to another embodiment of this disclosure.
Figure 12B:
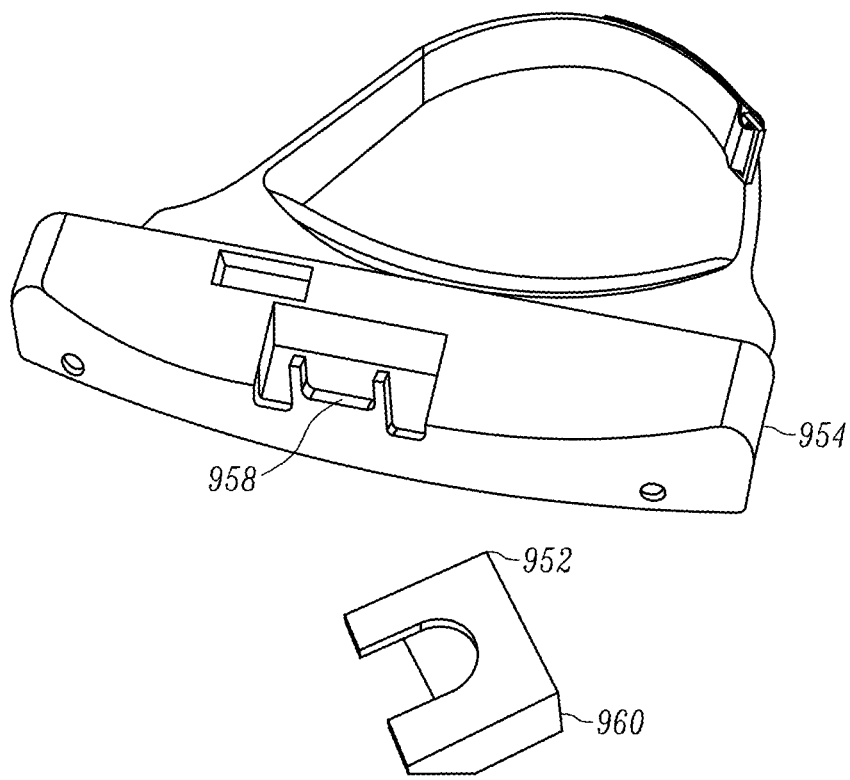
Figure 12C:
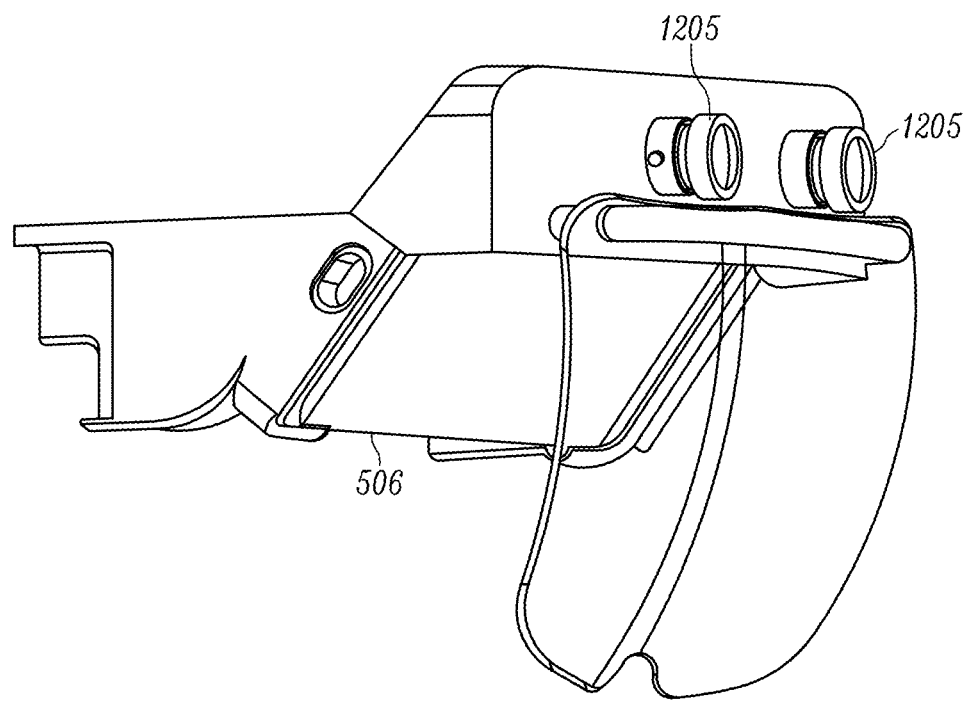

FIGS. 12A, 12B, and 12C illustrate another example embodiment of the HMD 950, which includes a cover 954 that has adaptor portions 952 configured to mount and hold a camera or video recording device attachment (not specifically shown) to the cover 954. As shown in FIG. 12A, the adapter 952 includes a portal 956 wherein a camera device may be mounted to the cover 954 to face in a forward or away from the frame direction and through the portal 956. Optionally, as shown in FIG. 12B, the camera may be a detachable accessory that fits in a detachable holder 960 that can be removably attached to an adaptor connector 958 on the upper part of cover 954.

In certain embodiments, as shown in FIG. 12C, the HMD 250 includes a stereo camera. For example, the cover 954 can include two or more cameras 1205 or can include connections for two or more cameras 1205. The two or more cameras 1205 can be coupled to the mobile device or smartphone 506 via a wired or wireless connection. For example, the two or more cameras 1205 can couple to the mobile device or smartphone 506 via a wired interface in the cover 954, such as via a communication interface. In certain embodiments, the two or more cameras 1205 can couple to the mobile device or smartphone 506 via a wireless interface, such as via a near-field communication protocol, such as BLUETOOTH.

Figure 13:
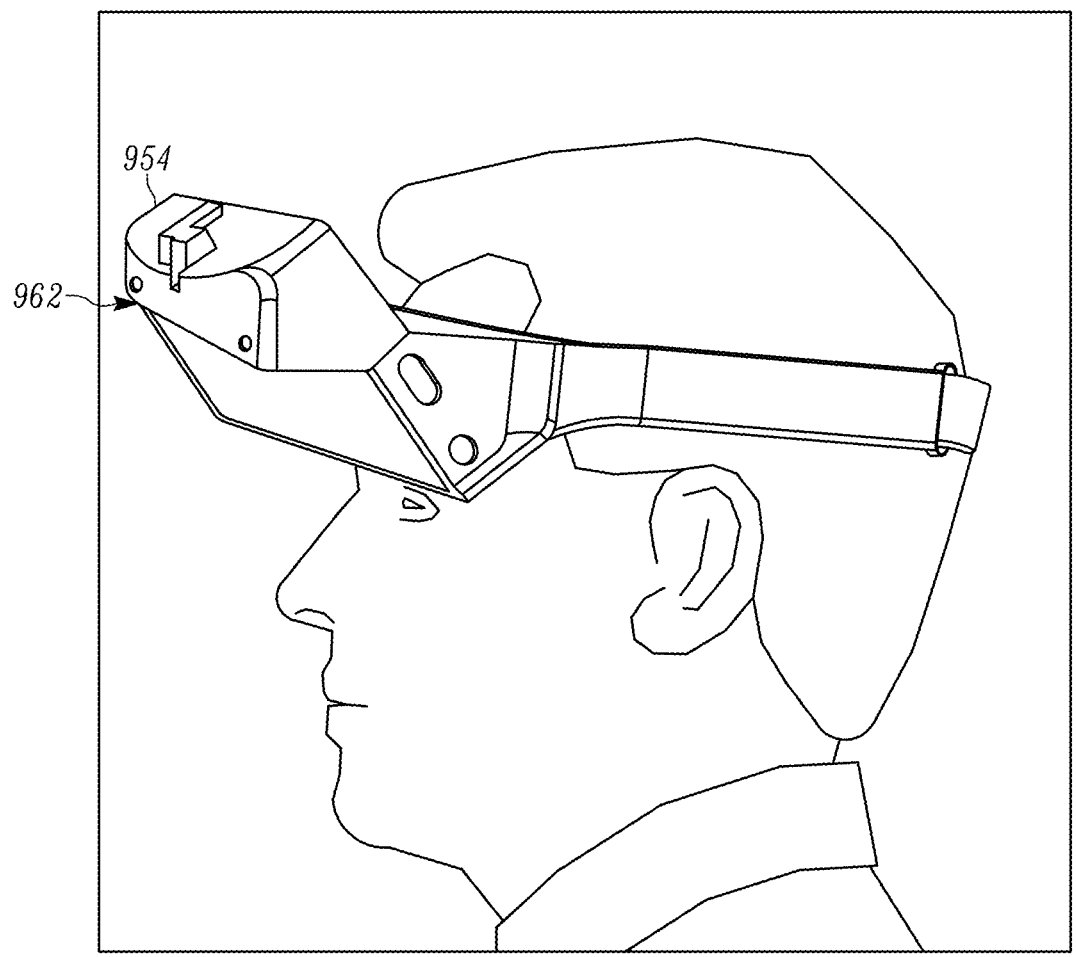
FIG. 13 illustrates an example HMD wherein the cover portion includes a mirror mechanism according to an embodiment of this disclosure.

FIG. 13 illustrates another example embodiment where the cover 954 includes a mirror mechanism 962 positioned under a front surface of the cover 954. The mirror or mirror mechanism 962 is positioned at an appropriate angle to reflect eye movement of the user toward a front facing camera of the mobile device held in the cartridge. For example, the mirror mechanism 962 may be positioned on an inner frame facing portion of the cover 954 such that eye movements of a user are reflected toward a camera of the mobile device (e.g., front camera, rear camera, etc.). The mirror mechanism 962 can include one or more mirrors. In some embodiments the near is in a fixed position that angles the mirror to reflect user eye movements toward the camera. Optionally, mechanisms, such as a motor, servo, gears, or piezo device, may be used that are signaled by the mobile device to adjust or are manually adjustable the angle or position the mirror so that it reflects user eye movements into the mobile device's camera. Optionally, other reflecting/refracting mechanisms such as prisms, lenses or other known optical elements can also redirect light or a reflection in various embodiments. In some embodiments, the mirror mechanism is mounted to the cartridge. Thus, the mirror mechanism and cartridge combination place the mirror mechanism in a position that reflects the user's eye movements into the camera of a particular mobile device being held in the selected cartridge.

Although the present disclosure has been described with example embodiments, various changes and modifications may be suggested to one skilled in the art. It is intended that the present disclosure encompasses such changes and modifications that fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A head mounted apparatus comprising:
   a frame;
   a band structure removably coupled to the frame;
   a first cartridge removably coupled to a portion of the frame, the first cartridge configured to hold a display, wherein when the first cartridge is coupled to the portion of the frame and is holding the display, the display is oriented to face away from the frame at a selected angle;
   a cover structure removably attached to at least one of the portion of the frame and the first cartridge; and
   a visor removably attached to the cover structure and disposed such that a surface of the visor reflects an image displayed on the display, the visor comprising a transparent material.

2. The head mounted apparatus of claim 1, wherein the display comprises a first mobile device and the first cartridge comprises a first recess to removably couple to the first mobile device.

3. The head mounted apparatus of claim 2, further comprising a second cartridge configured to removably couple to the portion of the frame in place of the first cartridge, the second cartridge comprises a second recess to removably couple to a second mobile device, wherein the second recess and the second mobile device are each different sizes than the first recess and the first mobile device.

4. The head mounted apparatus of claim 2, wherein the first cartridge comprises an identifier readable by the first mobile device.

5. The head mounted apparatus of claim 2, wherein at least one of the cover structure and the first cartridge comprises a mirror mechanism positioned to reflect eye movements of a wearer toward a camera of the first mobile device.

6. The head mounted apparatus of claim 1, wherein the cover structure comprises at least one of a camera mount or a camera.

7. The head mounted apparatus of claim 6, wherein the camera mount comprises an electronic input-output interface for electronically coupling the camera to one of the display or a mobile device coupled to the display.

8. The head mounted apparatus of claim 1, wherein the surface of the visor reflects the image displayed on the display toward the frame.

9. The head mounted apparatus of claim 2, wherein the first cartridge further comprises a bottom surface and sidewalls, the sidewalls being about at least a portion of a perimeter of the first recess.

10. The head mounted apparatus of claim 1, wherein the frame comprises at least one of a bracket and a clip that engages the first cartridge when the first cartridge is removably coupled to the portion of the frame.

11. A method comprising:
   providing a frame;
   providing a band structure removably coupled to the frame;
   removably coupling a first cartridge to a portion of the frame, the first cartridge configured to hold a display, wherein when the first cartridge is coupled to the portion of the frame and holding the display, the display is oriented to face away from the frame at a selected angle;
   providing a cover structure removably attached to at least one of the portion of the frame and the first cartridge; and
   providing a visor removably attached to the cover structure and disposed such that a surface of the visor reflects an image displayed on the display, wherein the visor comprises a transparent material.

12. The method of claim 11, wherein the display comprises a first mobile device and the first cartridge comprises a first recess to removably couple the first mobile device.

13. The method of claim 12, further comprising providing a second cartridge configured to removably couple to the portion of the frame in place of the first cartridge, the second cartridge comprises a second recess to removably couple to a second mobile device, wherein the second recess and the second mobile device are each different sizes than the first recess and the first mobile device.

14. The method of claim 12, wherein the first cartridge comprises an identifier readable by the first mobile device.

15. The method of claim 12, further comprising providing a mirror mechanism on at least one of the cover structure and the first cartridge, the mirror mechanism positioned to reflect eye movements of a wearer toward a camera of the first mobile device.

16. The method of claim 11, further comprising providing at least one of a camera mount or a camera on the cover structure.

17. The method of claim 16, wherein the camera mount comprises an electronic input-output interface for electronically coupling the camera to one of the display or a mobile device coupled to the display.

18. The method of claim 11, further comprising reflecting, by the surface of the visor, the image displayed on the display toward the frame.

19. The method of claim 12, wherein the first cartridge further comprises a bottom surface and sidewalls, the sidewalls being about at least a portion of a perimeter of the first recess.

20. The method of claim 11, wherein the frame comprises at least one of a bracket and a clip that engage the first cartridge when the first cartridge is removably coupled to the portion of the frame.

* * * * *